United States Patent [19]

Bucher

[11] Patent Number: 5,064,143
[45] Date of Patent: Nov. 12, 1991

[54] AIRCRAFT, HAVING A PAIR OF COUNTER ROTATING ROTORS

[75] Inventor: Franz Bucher, Basel, Switzerland

[73] Assignee: Sky Disk Holding SA, Fribourg, Switzerland

[21] Appl. No.: 505,787

[22] Filed: Apr. 6, 1990

[30] Foreign Application Priority Data

Apr. 19, 1989 [CH] Switzerland .................. 1492/89

[51] Int. Cl.⁵ .................................................. B64C 29/00
[52] U.S. Cl. ................................. 244/23 C; 244/12.2; 244/12.3; 244/23 B
[58] Field of Search .............. 244/12.2, 12.3, 23 C, 244/23 B, 17.19

[56] References Cited

U.S. PATENT DOCUMENTS

| | | | |
|---|---|---|---|
| 2,461,435 | 2/1949 | Neumann et al. | 244/12 |
| 2,777,649 | 1/1957 | Williams | 244/23 |
| 2,863,621 | 12/1958 | Davis | 244/23 C |
| 2,880,945 | 4/1959 | Crane | 244/12.3 |
| 3,395,876 | 8/1968 | Green | 244/23 |
| 3,397,852 | 8/1968 | Katzen | 244/12.3 |
| 3,437,290 | 4/1969 | Norman | 244/12.2 |
| 3,599,901 | 8/1971 | Relkil | 244/12.3 |

FOREIGN PATENT DOCUMENTS

| | | | |
|---|---|---|---|
| 474805 | 2/1973 | Australia . | |
| 676481 | 12/1963 | Canada | 244/23 C |
| 678700 | 1/1964 | Canada | 244/23 C |
| 1347733 | 10/1962 | France | 244/23 C |
| 558737 | 2/1975 | Switzerland | 244/23 C |

Primary Examiner—Joseph F. Peters, Jr.
Assistant Examiner—Christopher P. Ellis
Attorney, Agent, or Firm—Fish & Richardson

[57] ABSTRACT

The aircraft has a pair of rotors driven to counter-rotate within a housing. The housing has adjustable air guiding discuss for the rotor stream and a airfoil-like outer shape to generate lift at horizontal flight. The air guiding devices include a circular arrangement of a plurality of individual sectors having tangentially extending blades arranged in a zone below the rotors. In each sector the blades are adjustable in their position relative to the rotor stream. In at least some of the sectors, the blades are arranged in pairs for an adjusting movement in opposite relative sense. The air guiding devices allow precise and easy control of the aircraft maneuvers.

11 Claims, 5 Drawing Sheets

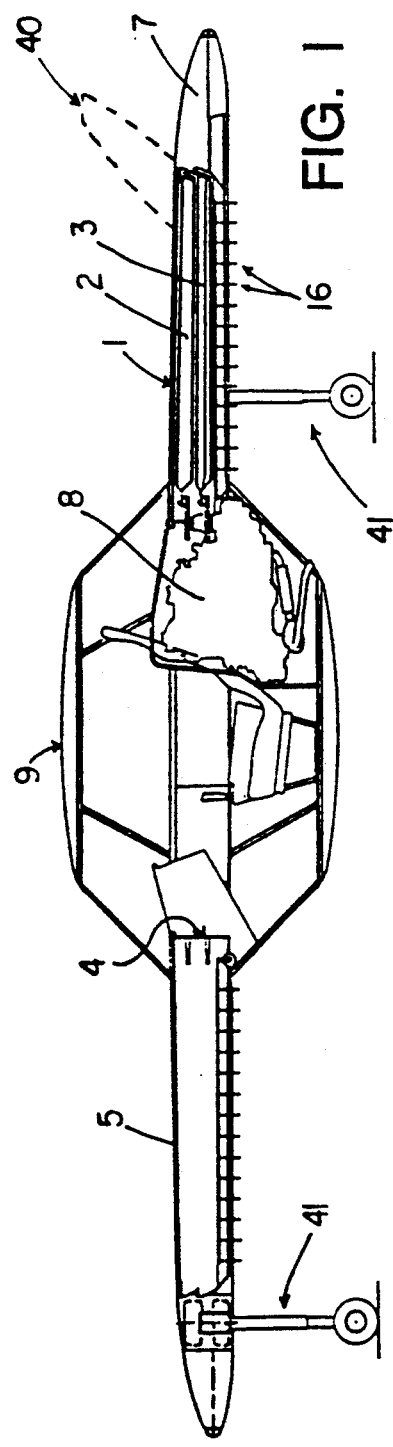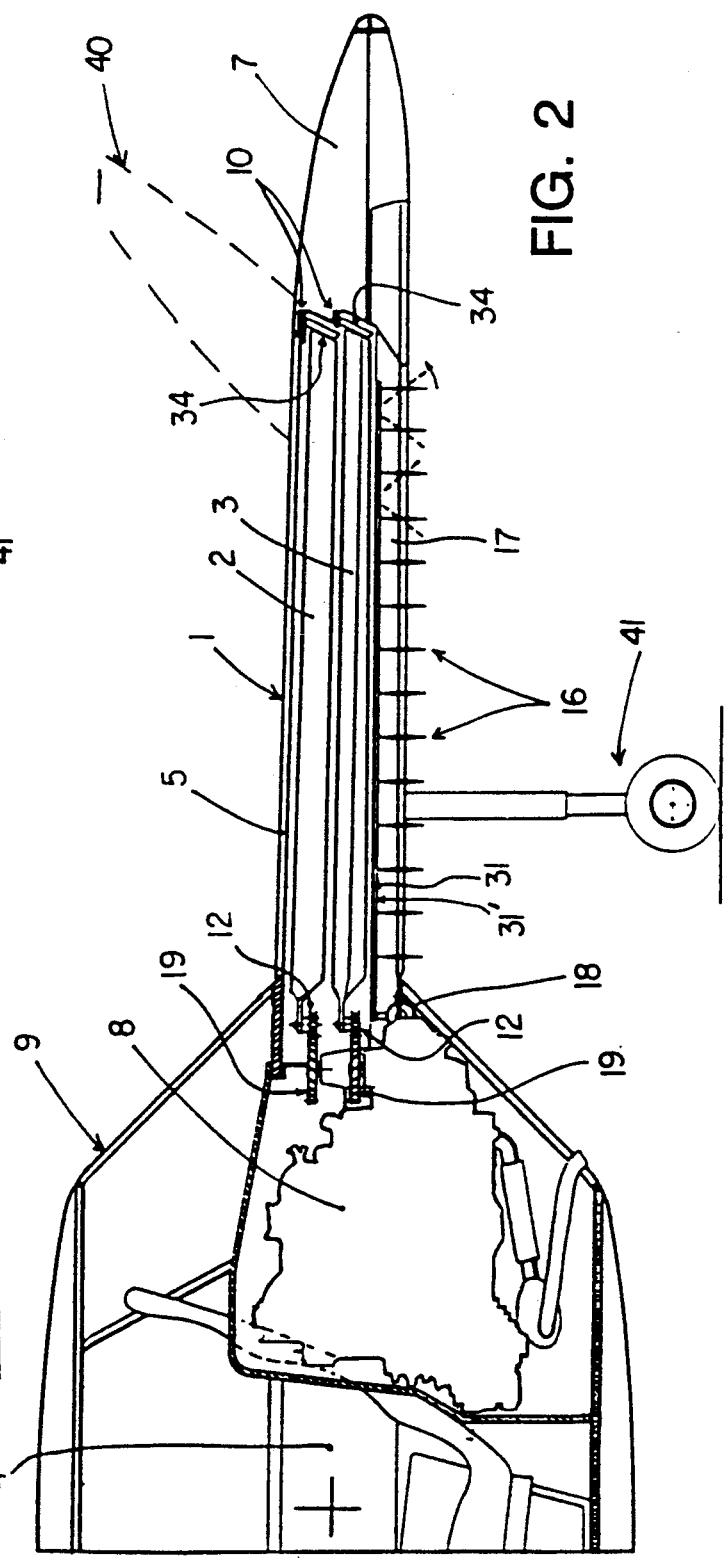

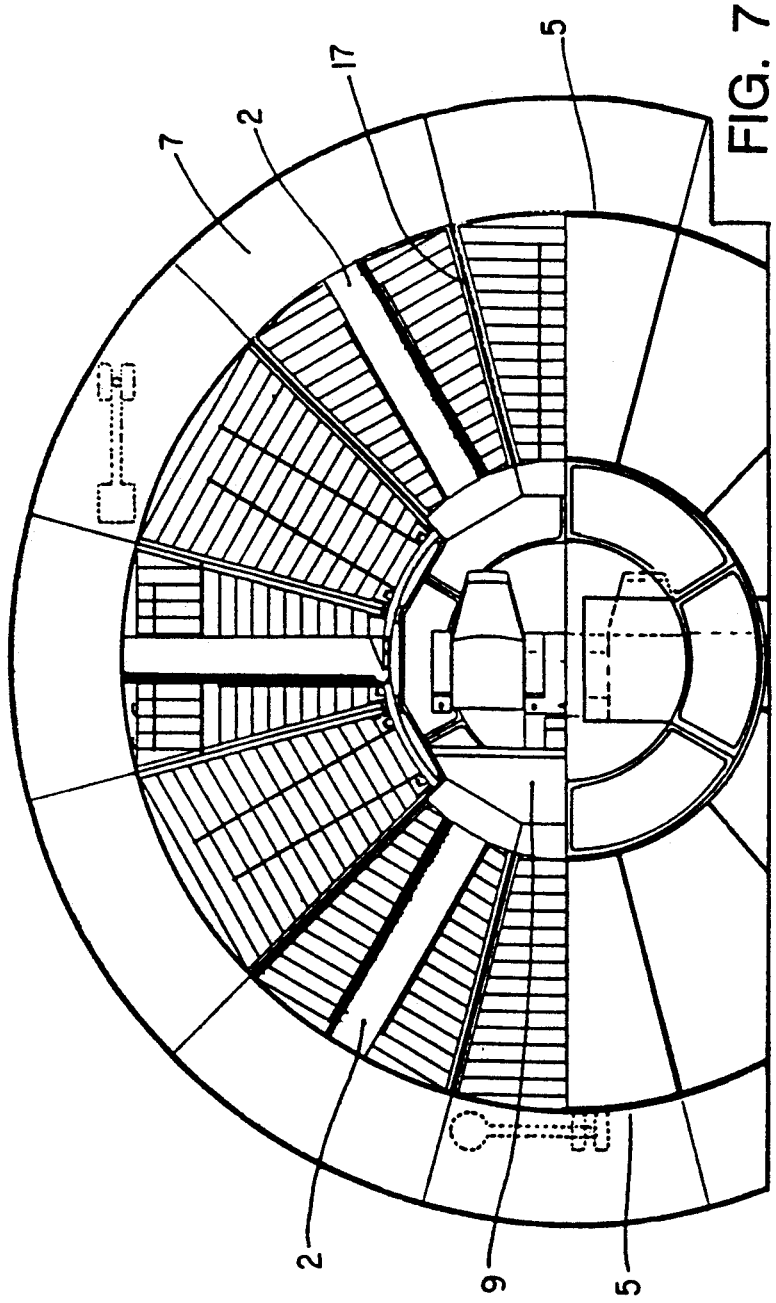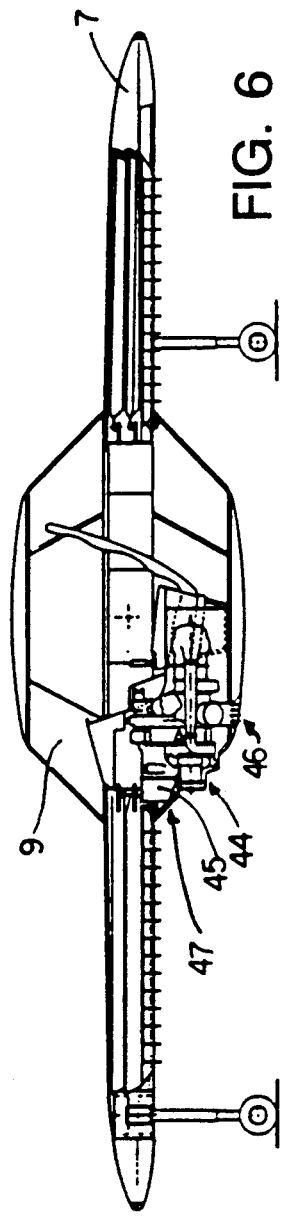

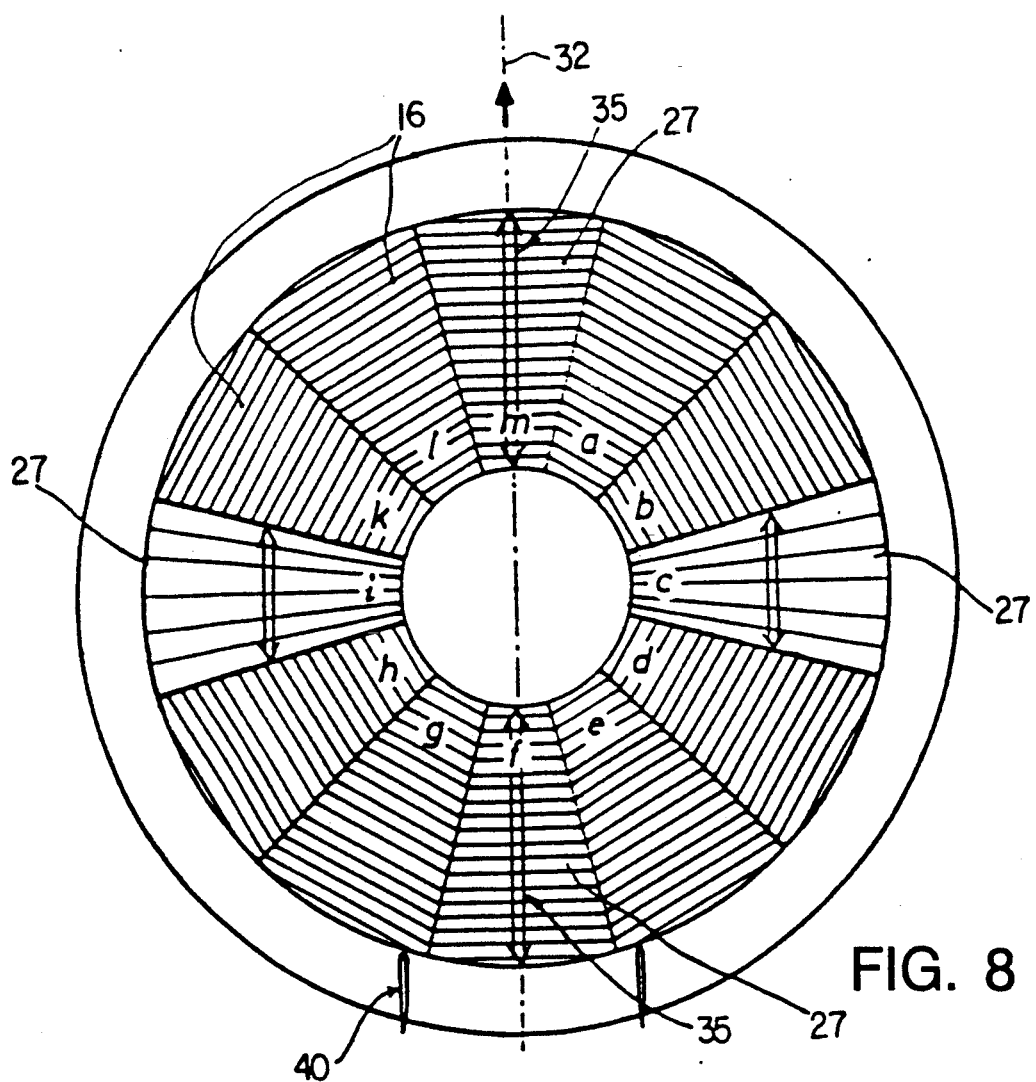
FIG. 8
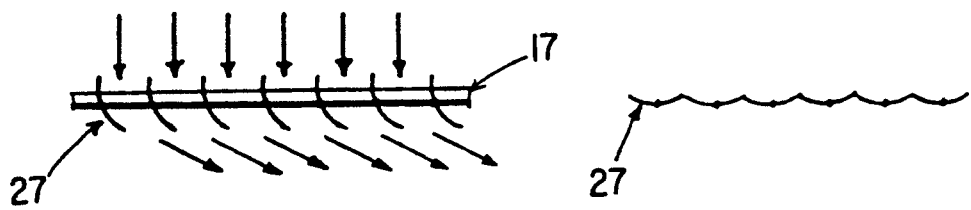
FIG. 9
FIG. 10

AIRCRAFT, HAVING A PAIR OF COUNTER ROTATING ROTORS

BACKGROUND OF THE INVENTION

1. Field of the Invention

This invention relates to aircraft and more particularly to aircraft having a pair of counter rotating rotors.

Aircraft of this type are generally known in the form of helicopters. Helicopters have several severe disadvantages which limit their field of application substantially. The axis of their rotors e.g. needs to be located near the center (of gravity) of the helicopter which reduces the useful volume of the cabin. The complexity of control of helicopters requires expensive and extensive training of pilots. The speed in horizontal flight is limited by non symmetric relative air flow velocity at the rotor blades causing changing mechanical forces on the blades. The free blades are often a source of accidents, since every contact of the rotor blades with other objects results in an extremely dangerous situation for the aircraft.

2. Description of the Prior Art

Therefore, based on the general principle of helicopters it has been tried to avoid these disadvantages by enclosing the rotors partly or completely into a housing. Aircrafts of this type are disclosed in Swiss Patent Specification No. 558 737, in Australian Patent Specification No. 474 805 and in U.S. Pat. Nos. 2,777,649, 2,395,876 and 2,461,435. For controlling these aircrafts in flight, air directors are provided in the air stream of the rotors. By means of these air directors, the rotor stream is guided and deflected especially for horizontal flight. Therefore, the air directors or blades substantially extend in a transverse direction to the flight direction of the aircraft. For the hovering flight, however, the disclosed air director systems are not suited, since they do not allow the control of the aircrafts along all axes in space in the hovering flight. Especially, translational movements along all horizontal directions can not be controlled with the known systems in the hovering phase. Moreover, the control of these aircrafts is complicated because horizontal and vertical forces derived from the rotor stream in the hovering flight are in complex interdependence. Therefore, difficulties will arise in maneuvering and controlling these aircrafts.

SUMMARY OF THE INVENTION

Hence, it is a general object of the present invention to provide an improved aircraft of the above mentioned type capable of performing hovering flight with controlled translational and vertical movement in all directions and also having good flight characteristics in horizontal flight.

Another object of the invention is to provide an aircraft for hovering and horizontal flight, which can easily be controlled and which therefore does not make necessary a training of pilots longer than for ordinary airplanes.

Still another object of the invention is to provide an aircraft which in hovering flight can perform very precise maneuvers and therefore can approach and even contact objects during flight e.g. for rescue purpose.

A still further object of the invention is to provide an aircraft which in horizontal flight can reach speeds like ordinary air planes at relatively low consumption.

Now, in order to implement these and still further objects of the invention, which will become more readily apparent as the description proceeds, the aircraft is manifested by the features that a pair of rotors is arranged within a housing having adjustable air guiding means for the rotor stream, said housing having an airfoil-like shape generating aerodynamic lift at horizontal flight and said controllable air guiding means comprising a circular arrangement of a plurality of individual sectors having tangentially extending blades arranged in a zone below the rotors, the blades being in each sector adjustable in their position relative to the rotor stream, wherein at least in a some of said sectors the blades are arranged in pairs for an adjusting movement in opposite relative sense.

Especially, the arrangement of the blades in pairs for an adjusting movement in an opposite relative sense in defined sectors, which are active during hovering flight, allows an exact control of the aircraft position and movement since these sectors exclusively contribute to the vertical hovering forces without adding any horizontal components to the vertical vector. On the other hand, there are other sectors for controlling the horizontal movements in the hovering flight having blades which are collectively adjustable in the same sense in each sector to generate defined horizontal components by deflecting the rotor stream in each sector. In a preferred embodiment of the invention the adjustable air guiding means are arranged in sectors of 30°, each sector having its own servo drive means for adjusting the respective blades. Depending upon the actual control mode, the sectors can be connected to form groups controlled by one control signal only. By such actuation of the air guiding means in groups, the movements of the aircraft and the control system of the aircraft can be simplified considerably.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a radial section through the center of an aircraft according to a first embodiment of the invention;

FIG. 2 is a more detailed view of a part of FIG. 1;

FIG. 6 shows a radial section through the center of a second embodiment of the invention;

FIG. 7 is a top view of the second embodiment with partly removed upper cover of the housing;

FIG. 8 is a schematic bottom view of the air guiding sectors according to a further embodiment of the invention;

FIG. 9 schematically exhibits the blades in the propagation sectors in an open state, and FIG. 10 shows these blades in a closed

DESCRIPTION OF A PREFERRED EMBODIMENTS

Figure 3:
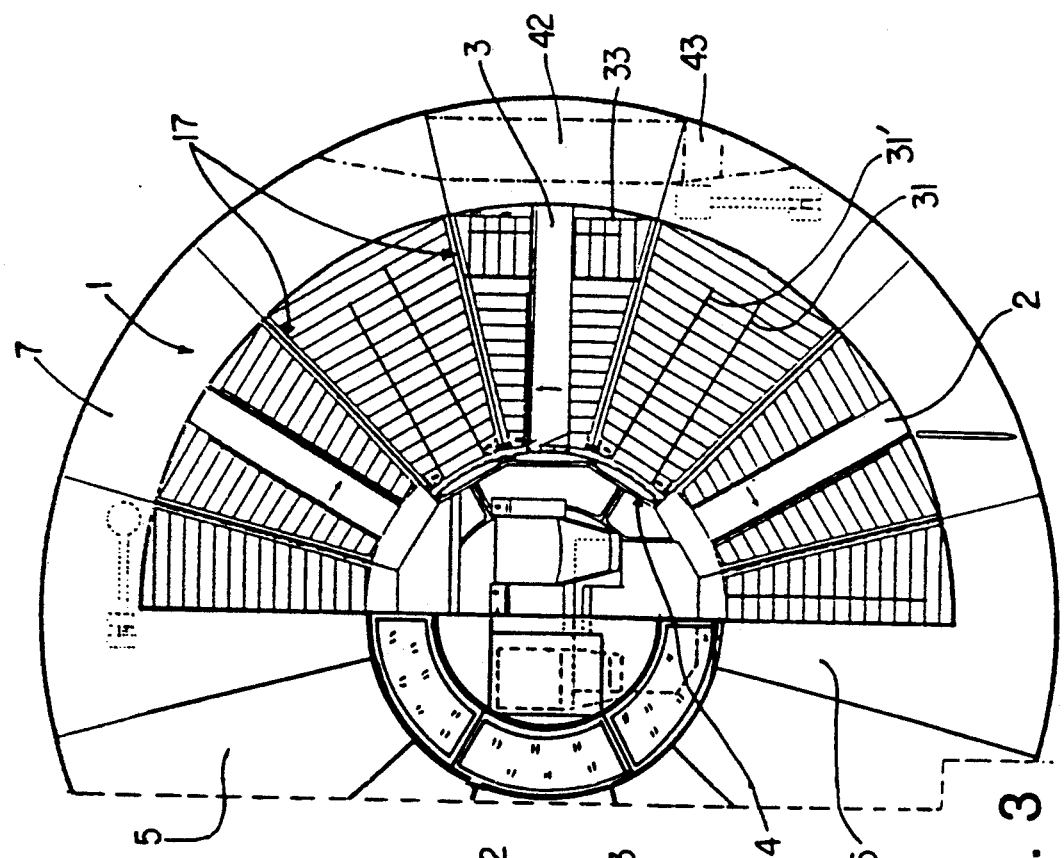
FIG. 3 is a top view on the aircraft of FIG. 1, with partly removed upper cover of the housing.

Based on the FIGS. 1 to 3, the over all structure of the aircraft of the invention will be explained first. Its basic element is a relatively flat housing 1 comprising a pair of coaxial rotors 2,3 driven to counter rotate with equal rotational speed. The housing 1 has a dish-like shape and in its longitudinal extension has an air-foil section causing dynamical lift in horizontal flight. In top view the housing substantially is circular. It therefore forms a circular wing allowing flying-modes of the aircraft resembling those of ordinary air planes, i.e. driven horizontal flight and non-driven gliding flight. The propulsion in this flying-mode is provided at least to a substantial portion by rearward deflection of the air stream generated by the pair of rotors 2,3, as will be explained in more detail.

The pair of rotors 2,3 together with said housing 1 form a ring-shaped channel for an air stream. This air stream is guided and deflected by air guiding blades 16 arranged in sectors a to m. In the center of this ring-shaped channel, i.e. in the center of gravity of the air craft, there is a cabin 9 for receiving the engine 8, the seats for the pilot and for the passengers.

The cabin 9 is radially defined by a cylindrical supporting ring 4 to which radial struts 17 are mounted. These radial struts 17 have a triangular cross section and are mounted with a base side towards the bottom and an edge looking upwards. They are mounted at their outer ends to a ring shaped outer structure 7. Said supporting ring 4, struts 17 and outer structure 7 together form a stable, stiff frame. Preferably, these elements are of a light, highly resistant material, as e.g. carbon-fibre or KEVLAR reinforced resins. The cylindrical supporting ring 4 defines a central open space for the above mentioned cabin 9, which in the described embodiment mainly is located in the rotor plane and is accessible from above. The engine 8 as well as the control systems are located in the rear bottom part of the cabin 9 as can be seen from FIG. 1.

Figure 5:
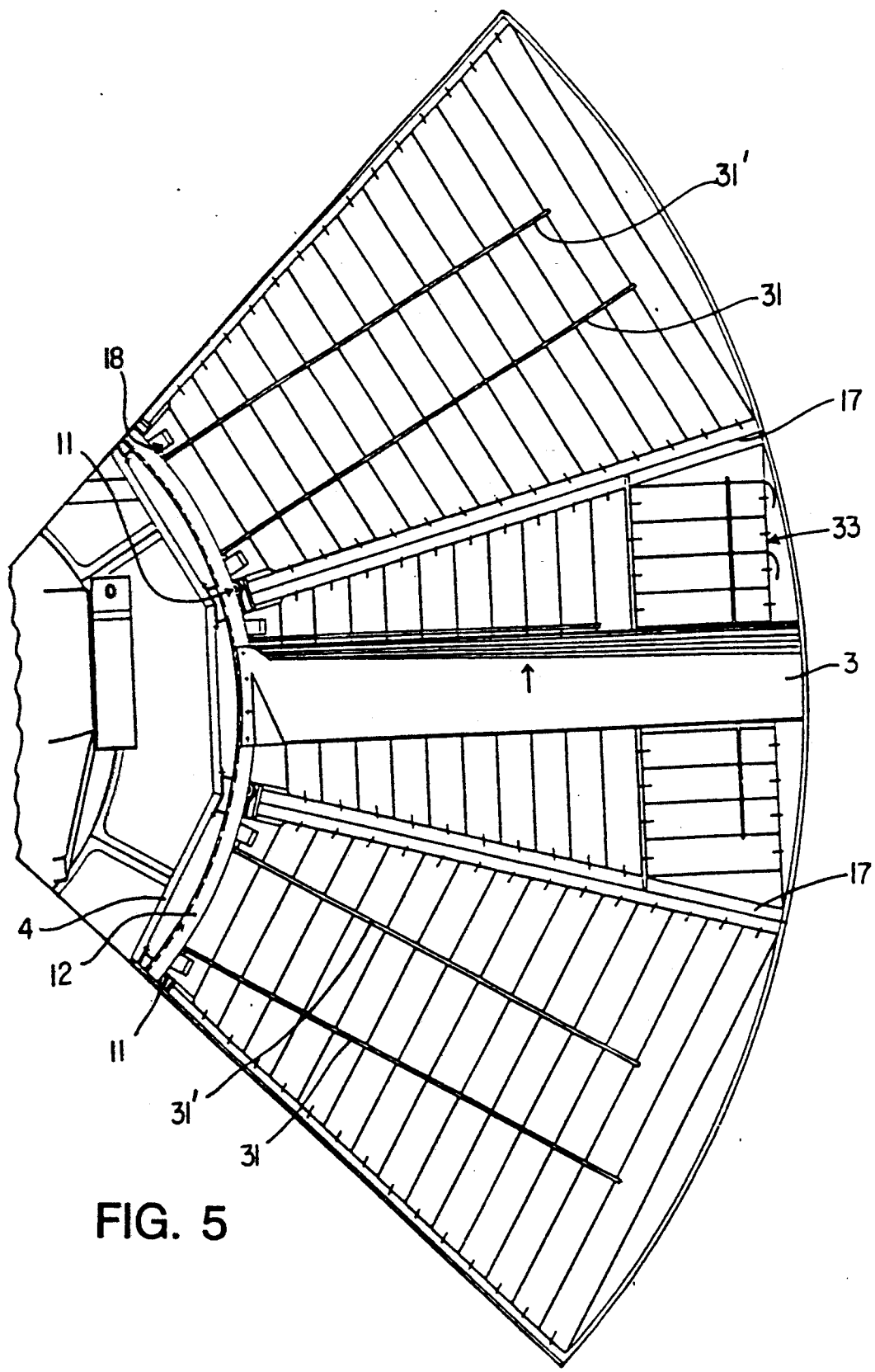
FIG. 5 exhibits three sectors of the air guiding means in detail.

At the supporting ring 4 bearing rollers 11 are mounted, on which for each rotor 2,3 a driving ring 12 is rotatively supported, as can be seen from FIG. 5. For absorbing axial forces the bearing rollers 11 are mounted at an angle to the rotor plane. Preferably, the driving rings 12 themselves form part of said roller bearings.

The rotor blades 2,3 can be axially supported at their outer ends to prevent axial deflection of the blades. To this end there are guides 10 at the outer structure 7 on which rollers 34 mounted at the outer ends of the blades 2,3 are supported (see FIG. 2). The guides preferably are coated with an elastomer material, as e.g. neoprene, to reduce the noise caused by the rollers 34.

Alternatively, provided that sufficiently stiff rotor blades 2,3 are used, the outer guides are not necessary and the outer ends of the blades remain unguided.

Each rotor comprises three blades mounted at angles of 120° to said driving rings 12. The blades are airfoils as known from helicopters and are fixedly mounted to said driving rings 12. Since the control of the air craft is performed by the air guiding blades and since the rotors are located within the housing 1, no collective pitch control or cyclic control of the rotor blades is necessary.

The rotor blades 2,3 are driven by means of a common engine 8 located in the rear bottom portion of the cabin 9. In the present embodiment of FIGS. 1 to 3 a reciprocating engine having a power of 220 H.P. is provided. Two driving gears 19 are connected via a power transmission to the engine 8 and are counterrotatingly driven. They mesh with said driving rings 12 of the rotors 2,3. In a second embodiment, which will be described later a gas-turbine engine 44 is used instead of the reciprocating engine 8 (see FIG. 6).

Consequently, the two rotors 2,3 are driven to rotate in opposite sense with exactly the same rotational speed, which leads to a compensation of the engine torque reaction. Additional small torques acting on the housing 1 can be absorbed by accordingly trimming the control system to be described. The housing portions above and under the rotor plane are provided with air openings. An upper covering portion comprises several coarse wire-lattice sections 5 through which the air passes without substantial pressure drop. The wire-lattice sections 5 can easily be removed for maintenance purposes. Below the rotor plane air guiding blades 16, 33 are arranged in a plurality of sectors. In most of these sectors the blades extend in tangential direction between the struts 17 and are adjustable along their longitudinal axis.

In the described embodiment each sector comprises an angle of about 30° so that a total of twelve sectors are provided. These sectors are structural units as well as control system units of the aircraft.

Figure 4:
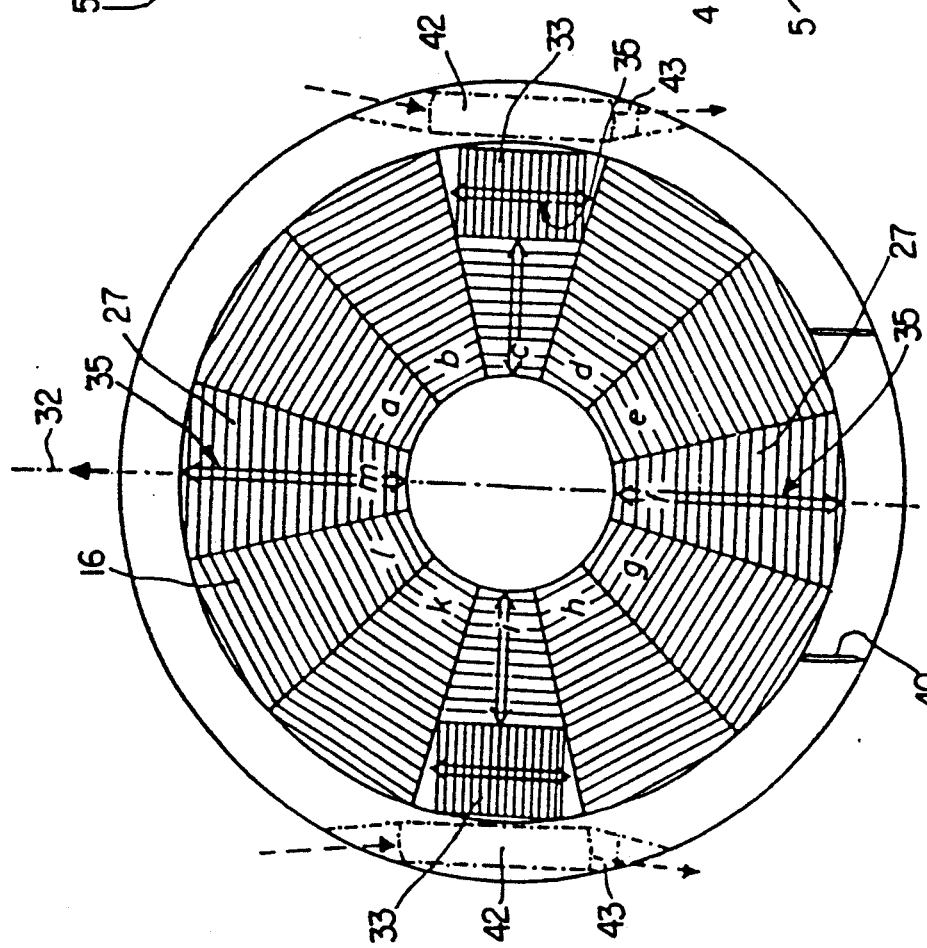
FIG. 4 is a schematic bottom view of the air guiding sectors.

The operation of these blade sectors in a first embodiment is explained by means of FIG. 4, showing a schematic bottom view. In this embodiment there are two different groups of sectors a to m, namely those serving exclusively for controlling the lifting forces in the hovering flight and those for also controlling horizontal forces. The first group comprises the sectors a, b, d, e, g, h, k, 1 (see FIG. 4). In these sectors the air guiding blades 16 are pivotally mounted and interconnected in pairs by actuating rods 31', 31'', so that adjacent blades are inclined in opposite sense as shown by dotted lines in FIG. 2. The actuating rods 31', 31'' are connected to a servo drive 18 provided in each sector for adjusting the blades in this sector. By the mentioned blade adjustment in opposite sense it can be avoided that horizontal force components are caused when closing or opening the blades to adjust the lifting forces of the rotors stream in the respective sections.

In order to control the position of the aircraft in the hovering flight, the blades of each sector can be opened or closed more or less, thereby influencing the lifting forces contributed by the respective sector. For adjusting the roll angle, i.e. for rotation about the longitudinal axis 32 (FIG. 4), the sector groups b, d and h, k are actuated. For influencing the pitch angle, i.e. the angle about the lateral axis of the aircraft, the sector groups a, l and g, e are actuated.

The total hovering lift forces influencing the vertical movement of the aircraft in the hovering flight are adjusted by collectively opening and closing the blades of the mentioned first sector group.

In order to generate horizontal propulsion forces in the hovering flight a second group of sectors m, f and c, i is provided. The blades in these sectors are pivotally mounted and interconnected by said actuating rods 31 for a collective parallel inclination to assume all the same angle relative to the rotor stream. By adjusting the blades in these sectors accordingly, horizontal forward and rearward movement of the aircraft as well as lateral movement can be controlled. In FIG. 4 the respective forces are schematically indicated by arrows 35. For generating additional horizontal propulsion forces for horizontal dynamical flight, separate propulsion means can be provided, as will be explained in detail.

For rotational movement of the aircraft around a vertical axis in the hovering flight there are two additional blade zones 33 in the sectors c and i, as can be seen from FIG. 4. The blades in the blade zones 33 mainly extend in radial direction. For inducing a rotational movement of the aircraft the blades in the left hand zone are inclined in the opposite sense to those in the right hand group thereby producing a torque about the vertical axis of the aircraft.

The neutral position of the blades in the second sector group is the open position (see FIG. 2), from which they are inclined more or less in accordance with a respective control command.

In the horizontal, dynamical flight, the blades of the first sector group are closed and form part of the airfoil. In this flying mode the blades in the sectors m and f and in the blade zones 33 are inclined to deflect the rotor stream in a direction opposite to the flying direction thereby causing a propulsion force. In addition a separate propulsion unit can be provided, as will be explained.

The blade zones 33 moreover are used to control and change the direction of flight in horizontal forward flight. They therefore substitute the ailerons and the rudder of ordinary airplanes. By controlling the inclination of the blades in the left-hand or right-hand zone 33 turns can be initiated in horizontal flight. For emergency landings due to failure of the rotor driving engine the blades in the sectors m and f are closed to improve the gliding characteristic of the aircraft. For stabilizing the gliding flight, vertical stabilizing surfaces 40 located in the outer structure 7 can be swung out (see FIG. 1 and 2).

The outer structure 7 is a substantially hollow body in a light, stiff construction at which the radial struts 17 are mounted. In the outer structure 7 fuel tanks and a retractable landing gear 41 in tricycle configuration are provided. Additional propulsion units 42 may be also provided in the outer structure 7 as schematically shown in FIG. 3.

The housing 1 and the outer structure 7 are composed of several identical modules, each module defining a sector of 30°. Therefore, the whole structure comprises a relatively low number of different components. As already mentioned, the housing 1 is shaped as a circular airfoil causing lift in horizontal flight.

In the following, the control system of the aircraft will be explained in more detail. Thereby, two flying modes have to be clearly distinguished, i.e. the hovering flight and the horizontal flight. In the hovering flight both the vertical lift and the horizontal propulsion are generated by the action of the rotors 2, 3, whereas in the horizontal flight or cruise a substantial part of the lift is dynamical lift by the airfoil shaped housing. The propulsion may be generated by deflecting the rotor stream in some blade sections and/or by additional propulsion means. The control procedure differs depending upon the two mentioned flight modes. In a transition mode the control is switched between the two flight modes.

In each flight mode there are six different control functions which can be influenced in the present embodiment by means of two manually actuated control members of conventional design. The manually actuated control members are connected to a control computer (not shown), which according to a control program transmits control signals to the servo drives 18 of the blade sectors and to the engine. The transition between hovering flight and horizontal cruise is performed automatically by said program depending upon the measured velocity of flow at the housing 1. As soon as a sufficient air speed is achieved the transition mode is terminated and the horizontal flight or cruise mode is assumed. The pilot does not recognize these different modes since the functions of the control members remain substantially the same. If the control members are not actuated, i.e. are in a neutral position, the control program transmits control signals to maintain the flight stability and the horizontal position of the aircraft depending on the signals of an attitude and altitude measuring system of known type. By means of the first control member in the form of a control column, all horizontal displacements in the hovering flight are controlled, whereas by means of the second control member also in the form a control column the pitch and roll angle in the hovering and in the horizontal flight are influenced.

In the following the six control functions in hovering mode are explained in detail thereby referring to FIG. 4:

1. Vertically ascending and descending by more or less opening the blades of the sectors a, b, d, e, g, h, k, l by means of the first control member. In the neutral position of the control members the aircraft is automatically kept on constant height by the control computer which influences the blades in each of the above sectors according to the signals received from said attitude and altitude measuring system;

2. Forward and rearward movement in a horizontal plane by tilting the blades in the sectors m and f from a vertical opened position into an inclined position by means of the first control member;

3. Movement to the left and to the right in a horizontal plane by tilting the blades in the sectors c and i from a vertical, opened position into an inclined position by means of the first control member;

4. Rotation around the vertical axis by moving the blades in the two zones 33 from a vertical, opened position into an inclined position to generate a torque relative to the vertical axis by means of the second control member:

5. Influencing the pitch angle by closing or opening the blades in the sectors e and g or l and a from their position described in para 1 by means of the second control member, and 6. Influencing the roll angle by closing or opening the blades in the sectors h and k or b and d from their position described in para 1 by means of the second control member.

Substantially the same control functions are provided for the horizontal forward flight, wherein, however, the blades are in other positions. Only the second control member is used in this mode, whereas the first one is out of function. In the horizontal forward flight or cruise all blades are closed except those of the sectors m and f and of the zones 33 in the embodiment of FIG. 4. The blades in said sectors or zones are adjusted to a more or less inclined position to deflect the rotor stream rearward. In this mode there is no need for the above described function No. 4 since turns are controlled by controlling the inclination of the blades in the zones 33. For changing the pitch in the horizontal cruise flight the blades in the sectors m or f are opened or closed more or less thereby increasing or reducing the lift forces in the respective sector. The blades in these sectors preferably have a circular profile as shown in FIGS. 9 and 10, which allows improvement of the rotor stream deflection in these sectors. The deflection of the rotor stream then is about 70° in an optimal position of the blades. As shown in FIG. 10 the blades of this type also can be completely closed which is the case in the hovering mode.

As can be seen from the foregoing description, the same blade sectors are used in the hovering mode and in the horizontal flight mode for the same control function. However, in the first mode the blades are adjusted from a vertical open position and in the second mode the same blades are adjusted from a substantially closed or inclined position. The second control member thereby serves to control all rotational movements of the aircraft around the three axes in space which allows performance all maneuvers in the horizontal flight. The first control member, on the other hand, influences all translational movements along the three axes in space and therefore is only effective in the hovering mode together with the first control member.

The transition between the two mentioned modes is not performed abruptly. For the transition from the hovering into the horizontal flight mode the lift caused by the pair of rotors is slowly reduced by closing the blades in the sectors b, d and h, k depending upon the growing dynamical lift by increase of the forward speed. During this transition especially the blades in the sectors l, a and e, g collectively can assume a parallel, inclined position instead of being inclined in opposite sense as this is the case in hovering flight in order to increase the forward propulsion forces. By means of these sectors the pitch angle of the aircraft can be influenced in the transition phase.

The propulsion forces in the horizontal or cruise flight are generated by the reaction of the rotor air stream deflected rearward by means of the blades in the sectors m, f and in the zones 33. If bigger propulsion forces are necessary for higher speeds additional propulsion means are provided. There are several alternative possibilities for such additional propulsion means. As a first possibility, which is schematically shown in FIGS. 3 and 4, two turbojet engines 42 are provided in the outer structure 7 on both sides of the longitudinal axis 32 of the aircraft. At the outlet of each turbojet engine 42 gas deflection means 43 of known type are provided, by which the gas leaving the turbojet engine can be deflected into vertical direction during hovering flight. The thrust of these engines is only part of the weight of the aircraft (of about 1100 KP) since the main contribution to the lift is given by the rotors 2, 3. However, in the horizontal forward flight a substantial part of the propulsion at high speed may be taken over by the turbojet engines.

Instead of the turbojet jet engines 42 a propeller can be provided which is located above the outer structure 7 in the longitudinal axis 32 of the aircraft (not shown). The propeller can be coupled to the engine 8 for the rotors 2, 3 in the horizontal flight and uncoupled therefrom in the hovering mode.

In a further preferred embodiment of the invention, which is exhibited in the FIGS. 6 and 7, the engine for driving the rotors 2, 3 is a turbine engine 44 located between the two seats in the cabin 9. The turbine is connected via a reduction gear box 45 to the rotors 2, 3. The turbine gases furthermore give a contribution to the lift in the hovering mode and to the propulsion in the horizontal flight mode. To deflect to turbine gases accordingly adjustable blades 46 are provided at the turbine outlet, which is located at the bottom of the cabin 9. The inlet 47 of the turbine is provided at the lower front end of the cabin 9 as can be seen from FIG. 6. In the hovering mode, the turbine gas stream is deflected to the vertical by means of the blades 46 and thereby contributes to the lift. In the horizontal flight, the gases are deflected rearward so that the reaction forces act in forward direction.

Still another embodiment of the invention is exhibited in FIG. 8. In this embodiment the blades 27 in the sectors c and i are arranged in substantially radial direction. These sectors c and i thereby contribute to the propulsion generated by the sectors m and f in horizontal flight. They preferably have a curved profile as shown in FIGS. 9 and 10 to more efficiently deflect the rotor stream. Therefore, in the horizontal flight mode, the blades 27 in the sectors m, f and c, i are opened as shown in FIG. 9, whereas the blades in the other sectors are closed. Since the open sectors m, f and c, i are equally distributed over the rotor stream there is an equal pressure distribution within the housing 1. For the control procedure in detail it can be referred to the description of the embodiment of FIG. 4.

The aircraft according to the invention can be designed as an unmanned aircraft controlled by radio. However, it is especially useful for the transportation of people and for aerial rescue. In these versions the aircraft can be provided with two seats as in the described embodiments or with four seats. It thereby combines the advantages of helicopters, i.e. hovering flight, with those of air planes, i.e. relatively high speed at low consumption. Moreover, all helicopter maneuvers can be performed without any danger of rotor contact and without swinging relative to the vertical axis. Therefore, the aircraft is especially useful for rescue operations, since it can contact fixed objects in flight. In the horizontal flight, on the other hand, all maneuvers of an ordinary air plane can be performed. Especially, normal take-off and landings using dynamical lift are possible. In the case of engine break-down the aircraft can be landed in gliding flight as already described.

The aircraft can be used for long distance flights due to its high speed and low fuel consumption in horizontal flight. The control is easy since it corresponds to the normal human reactions and can be performed manually without using the feet. The construction of the aircraft is relatively simple due to its modular structure. All sectors are based on substantially the same components which considerably reduces the number of components necessary for this aircraft.

While there are shown and described present preferred embodiments of the invention, it is to be distinctly understood that the invention is not limited thereto, but may be otherwise variously embodied and practiced within the scope of the following claims.

I claim:

1. An aircraft for hovering and horizontal forward flight, having a housing with a flight axis defining a forward flight direction, at least a pair of rotatively driven, coaxial rotors located within said housing for generating a rotor air stream and a multiplicity of adjustable air guiding means arranged in said rotor air stream, said housing along said flight axis being shaped as an airfoil section with an upper surface and a lower surface, said upper surface comprising a circular air inlet coaxial with said pair of rotors and said lower surface comprising a circular air outlet coaxial with said pair of rotors, said circular air outlet being divided into a plurality of blade array sections, each comprising a plurality of elongate blade members having a longitudinal swivelling axis and forming air guiding surfaces, wherein for each blade array section the blade members are collectively adjustable in their angular position relative to said air stream about their swivelling axis and wherein in a part of said blade array sections, adjacent blade members are adjustable in opposite sense to assume complementary angular positions between an opened and a closed position for controlling the lifting forces without generating a substantial horizontal component of the air stream passing said part of blade array sections.

2. The aircraft of claim 1, wherein at least part of said blade array sections form propulsion sections in which the said blade members extend transversely to said flight axis and said blade members are adjustable to all assume the same inclined position relative to said air stream to generate a horizontal component of the air stream passing the blade array sections.

3. The air craft of claim 2, further comprising a control system having two different operational modes, a first operational mode referring to said hovering flight and a second operational mode referring to said horizontal forward flight, wherein, in the second operational mode, the blade members of said propulsion sections are connected to said control system and the blade members of the other said sectors are in a closed state.

4. The aircraft of claim 3, wherein an attitude and altitude measuring system is provided for defining a horizontal position of the aircraft, said measuring system being connected in said first mode with said control system to automatically adjust the said blade members for keeping the aircraft in horizontal position.

5. The aircraft of claim 1, wherein each said rotor comprises a driving ring guided on bearing rollers, and each said rotor comprises a plurality of rotor blades mounted to said driving ring and extending radially outwards, said aircraft further comprising a driving engine drivingly connected to said driving rings for driving said rotors.

6. The aircraft of claim 1, wherein said housing has an inner supporting ring from which a plurality of struts extend radially outwards, said struts defining said sections and being connected at an outer end thereof to an outer ring-shaped body, and wherein a cabin is provided within said inner supporting ring.

7. The aircraft of claim 6 wherein said struts having a triangular profile and wherein said blade members extend between adjacent said struts.

8. The aircraft of claim 1, wherein in addition to said pair of rotors additional propulsion means are provided acting along said flight axis.

9. The aircraft of claim 1, wherein said housing has an outer shape of a ring-shaped wing.

10. The aircraft of claim 2, wherein said blade members in said propulsion sections have a curved profile for deflecting said rotor air stream and wherein the said blade members of the other sections have a substantially flat profile.

11. The aircraft of claim 1, wherein, in at least part of said blade array sections, said blade members extend tangentially relative to said circular outlet and wherein, in at least part of said blade array sections, said blade members are adjustable to all assume the same inclined position relative to said air stream.

* * * * *

UNITED STATES PATENT AND TRADEMARK OFFICE
CERTIFICATE OF CORRECTION

PATENT NO. : 5,064,143
DATED : November 12, 1991
INVENTOR(S) : Franz Bucher

It is certified that error appears in the above-identified patent and that said Letters Patent are hereby corrected as shown below:

In the Abstract, line 3, "a" should be --an--.

Col. 1, line 25, insert --,-- after "ters".

Col. 2, line 11, delete "a".

Col. 3, line 29, insert --®-- after "KEVLAR".

Col. 4, lines 32 and 34, "31', 31"" should be --31,31',--.

Col. 7, line 53, insert --,-- after "7".

Col. 8, line 17, insert --,-- after "stream".

Col. 9, line 1, after "wherein" insert --,-- and after "section" insert --,--.

Col. 9, line 4, after "wherein" insert --,--; delete "a part of" and substitute --at least one--; and change "sections" to --section--.

Col. 9, lines 4-5, delete "adjacent blade members are adjustable in opposite sense" and substitute --at least one adjacent pair of first and second of said blade members is adjustable, said first blade member of said pair being disposed at a first angle to vertical and said second blade member of said pair being disposed at a second angle to vertical, said first angle being equal and opposite to said second angle, said blade members adapted--.

UNITED STATES PATENT AND TRADEMARK OFFICE
CERTIFICATE OF CORRECTION

PATENT NO. : 5,064,143

DATED : November 12, 1991

INVENTOR(S) : Franz Bucher

It is certified that error appears in the above-indentified patent and that said Letters Patent is hereby corrected as shown below:

Col. 9, line 9, delete "part of" and substitute —at least one said—; and change "sections" to —section—.

Signed and Sealed this

Fifteenth Day of November, 1994

Attest:

BRUCE LEHMAN

Attesting Officer

Commissioner of Patents and Trademarks